United States Patent
Fowler

[15] 3,663,042
[45] May 16, 1972

[54] SEWER TAP

[72] Inventor: Dwight W. Fowler, 705 S.W. 206th St., Aloha, Oreg. 97006

[22] Filed: Apr. 22, 1970

[21] Appl. No.: 30,766

[52] U.S. Cl. ........................................................... 285/199
[51] Int. Cl. ................................................................. F16l 41/00
[58] Field of Search ................. 285/199, 198, 197; 24/286, 24/283, 280, 281, 282, 125 R, 135 L

[56] References Cited

UNITED STATES PATENTS

| | | | |
|---|---|---|---|
| 2,783,771 | 3/1957 | Thomas | 285/197 X |
| 3,218,093 | 11/1965 | Carlson | 285/197 |
| 1,444,727 | 2/1923 | Burdin | 285/197 |
| 2,973,976 | 3/1961 | Steinen | 285/197 |
| 1,484,469 | 2/1924 | Brucelarie | 285/197 X |
| 812,625 | 2/1906 | Weston | 285/197 |
| 785,737 | 3/1905 | Jones | 24/283 |
| 2,255,793 | 9/1941 | Kridler | 24/125 R X |

FOREIGN PATENTS OR APPLICATIONS

| | | | |
|---|---|---|---|
| 607,102 | 7/1960 | Italy | 285/197 |
| 581,440 | 8/1959 | Canada | 285/199 |
| 646,131 | 7/1928 | France | 285/199 |
| 878,127 | 6/1953 | Germany | 24/135 L |

Primary Examiner—Thomas F. Callaghan
Attorney—Buckhorn, Blore, Klarquist and Sparkman

[57] ABSTRACT

A sewer tap for a main sewer line includes a branch pipe extending into a drilled aperture in the sewer line through an annular clamping plate disposed in spaced relation to the side of the sewer line. An O-ring seal is located between the clamping plate and the side of the sewer line, while a pair of studs provided at ends of a cable passing around the sewer line are engaged by nuts for tightening the clamping plate against the O-ring seal.

11 Claims, 7 Drawing Figures

PATENTED MAY 16 1972 3,663,042
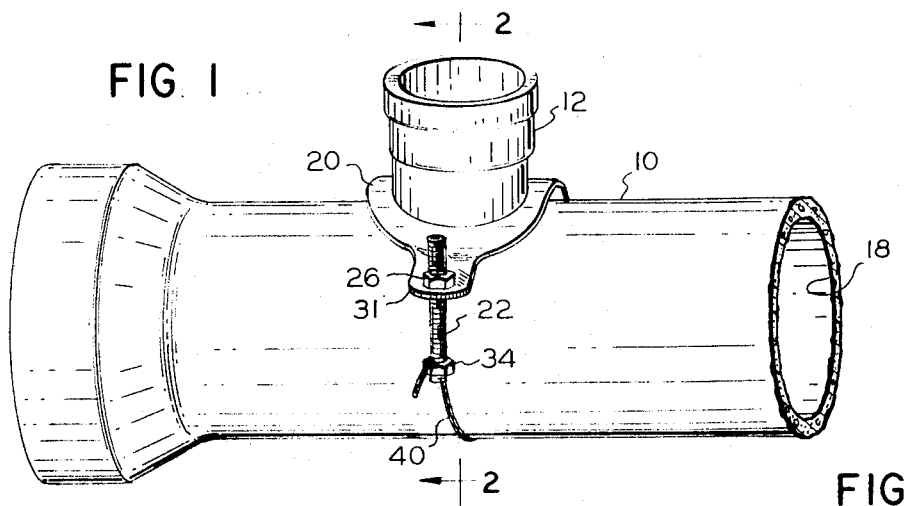
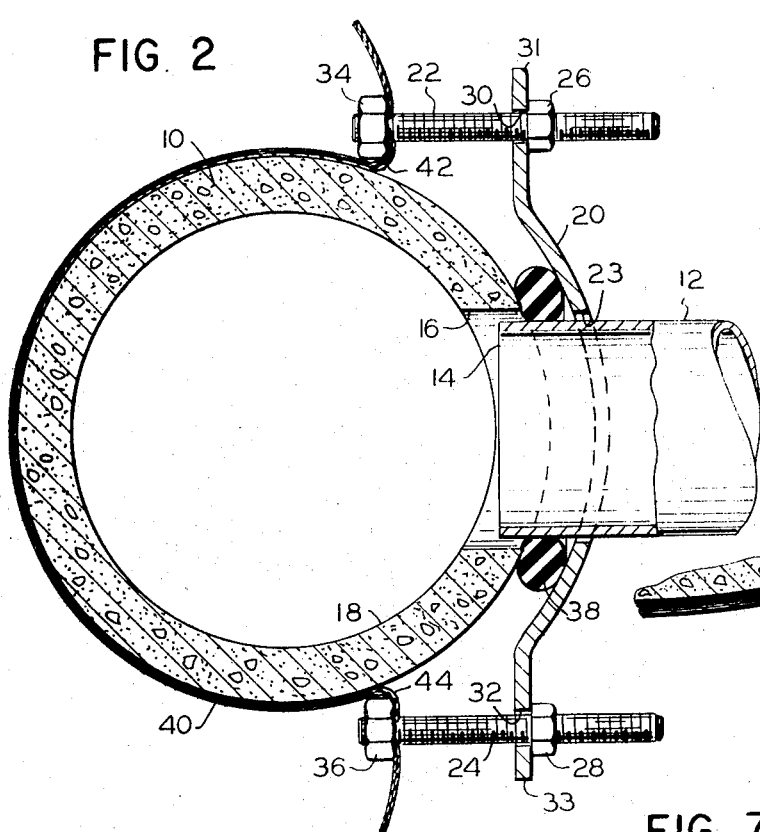
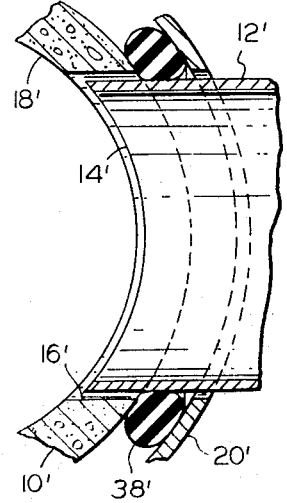
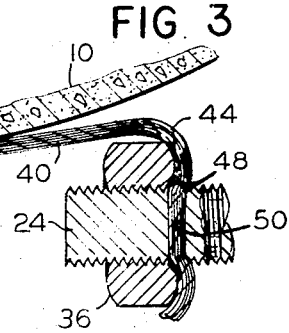
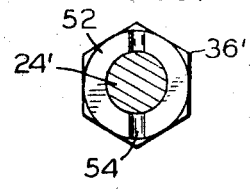
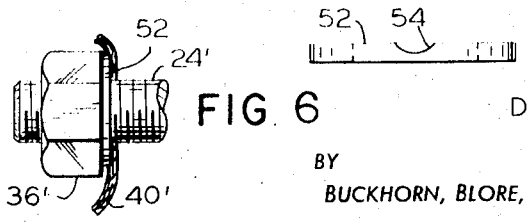
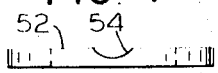
DWIGHT W. FOWLER
INVENTOR
BY
BUCKHORN, BLORE, KLARQUIST & SPARKMAN
ATTORNEYS

SEWER TAP

BACKGROUND OF THE INVENTION

In general, sewer taps of prior art have employed poured concrete or the like for sealing a branch pipe to a sewer main. This construction is subject to breakage when the connection is then covered up with earth, with resultant undesired filtration.

Various types of mechanical connections are also available which could be used to avoid the poured concrete construction. Many of these involve a saddle designed to fit around a main pipe over an aperture therein, while holding a conventional flat gasket between the saddle and the main pipe. A threaded connection or the like is frequently provided between the branch pipe and the saddle. Complex constructions of the latter type are not usually suitable for making sewer pipe connections because of the unnecessary expense involved in the complex mechanisms and because of the problem of making a proper connection underground, e.g. in an excavation after uncovering an existing sewer main. Access must usually be had to the rear of such a connection. It is also difficult to apply a saddle and its attaching mechanism properly without at the same time trapping rock or other loose material as may impair the seal between the apparatus and the main. Moreover, rigid support such as a threaded connection for the branch pipe is not only expensive but may also result in possible breakage of the branch pipe and undesired filtration. Furthermore, in many instances the size of the sewer main to which attachment is to be made is not known until excavation is completed. An unusually large selection of matching pipe connection devices would be required in order to assure a correct fit in each case.

SUMMARY OF THE INVENTION

According to the present invention, a sewer tap for providing attachment to a main sewer line includes a branch pipe smaller in diameter than the main sewer line for insertion through an aperture in the main sewer line. An annular clamping plate is disposed in spaced relation to the side of the sewer line with the branch pipe extending through the aperture thereof, and a toroidal seal is located immediately around the branch pipe between the clamping plate and the main pipe. Means adjustably attached to the clamping plate at diametrically opposite sides thereof are employed for tightly drawing up the clamping plate toward the sewer line and compressing the toroidal seal against the sewer line and the branch pipe. This seals the junction of the sewer line and the branch pipe against outside filtration while at the same time securely supporting the branch pipe from the sewer line. The support of the branch pipe is, however, somewhat resilient so as to avoid unnecessary breakage.

The aforementioned means adjustably attached to the clamping plate desirably includes a cable extending around the sewer line and a pair of studs connected to ends thereof, these studs passing through ears on the clamping plate. Nuts are tightened down on these studs whereby the complete connection can be made substantially from one side the main sewer line, after the cable is merely passed around the main sewer line. The clamping construction is adaptable to any number of sizes of main sewer line and branch pipe.

It is an object of the present invention to provide an improved sewer tap for avoiding breakage and unnecessary filtration in the sewer tap connection.

It is another object of the present invention to provide an improved and economical sewer tap which is employed to seal and support a branch pipe relative to a main sewer line.

It is another object of the present invention to provide an improved sewer tap of uncomplicated construction adapted to sewer lines and branch pipes of varying sizes.

It is another object of the present invention to provide an improved sewer tap which can be completed with a minimum amount of excavation relative to the sewer line.

It is another object of the present invention to provide an improved sewer tap which is durable under continued use.

The subject matter which I regard as my invention is particularly pointed out and distinctly claimed in the concluding portion of this specification.

The invention, however, both as to organization and method of operation, together with further advantages and objects thereof, may best be understood by reference to the following description taken in connection with the accompanying drawings wherein like reference characters refer to like elements.

DRAWINGS

FIG. 1 is a side view of a sewer tap connection according to the present invention;

FIG. 2 is a cross section of the FIG. 1 connection taken through the main sewer line where a branch pipe extends therefrom, i.e. at 2—2 in FIG. 1;

FIG. 3 is a detailed cross section partially illustrating clamping means according to the present invention;

FIG. 4 is a partial cross section of a sewer tap connection including a branch pipe somewhat larger in diameter than the one illustrated in FIGS. 1 and 2;

FIG. 5 is a transverse cross section illustrating a portion of alternative clamping means;

FIG. 6 is a partial side view of the FIG. 5 clamping means; and

FIG. 7 is an edge view of a locking washer comprising part of the FIG. 5 clamping means.

DETAILED DESCRIPTION

Referring to FIGS. 1, 2, and 3, illustrating a sewer tap according to the present invention, a concrete or transite cylindrical pipe 10 comprises a portion of a sewer main which, it is understood, will ordinarily be buried below the surface of the ground. Branch pipe 12 is a section of pipe tapped into pipe 10 and extending in a direction normal to pipe 10, i.e. in substantially any direction perpendicular to the centerline of pipe 10. Pipe 12 may be formed of concrete, transite, cast iron, or some other suitable material, and is employed, together with other similar pipe sections, for providing a sewer connection from a house or other building to the sewer main beneath ground level.

For a branch pipe 12 of moderate diameter, e.g. half the diameter of the pipe 10 or less, the end of pipe 12 may be squared off as indicated at 14. A hole or aperture 16 slightly larger in diameter than the branch pipe 12 is provided in pipe 10 in the usual manner by drilling or the like, and branch pipe 12 is inserted into aperture 16 with the end 14 of branch pipe 12 preferably extending no further than the level of inner wall 18 of pipe 10. That is, pipe 12 desirably does not protrude into the interior cylindrical cavity of pipe 10 where it might impede the passage of materials in the main sewer line. In case pipe 12 is somewhat larger in diameter, as in the case of branch pipe 12' in FIG. 4, the pipe end 14' is desirably contoured for matching the level of inner wall 18'.

Returning to the embodiment of FIGS. 1 through 3, the connection includes a rigid annular clamping plate 20 having a central aperture 23 through which branch pipe 12 extends. As best illustrated in FIG. 2, the clamping plate 20 is disposed in spaced relation to the side of the sewer pipe including aperture 16. Aperture 23 is suitably slightly larger in diameter than the outside diameter of branch pipe 12 and may be approximately the size of the inside diameter of aperture 16. Branch pipe 12 extends through aperture 23, with clamping plate 20 forming part of means for clamping branch pipe 12 in place as hereinafter more fully described.

The clamping means further includes means adjustably attached to the clamping plate at diametrically opposite sides of the clamping plate and branch pipe 12, and extending around pipe 10 for drawing up the clamping plate 20 toward pipe 10. The last mentioned means here includes threaded studs 22 and 24 for passing through holes 30 and 32 in diametrically opposite ears 31 and 33 extending from either side of clamping plate 20 on opposite sides of pipe 12. Nuts 26 and 28 are received on first or threaded right-hand ends of studs 22 and 24, as viewed in FIG. 2, and are employed for drawing up the clamping plate.

Proximate second threaded ends of studs 22 and 24, each is provided with a diametrical bore 50 (see FIG. 3) through which a cable 40 is received. Cable 40 comprised a 3/16 inch stainless steel cable in a particular instance, stainless steel being advantageous because of rust resistance and resistance to stretching. The cable extends around pipe 10 between the second ends of studs 22 and 24, with studs 22 and 24 being of such length that the diametrical bores 50 therein are positioned to the right of the vertical centerline of pipe 10 as viewed in FIG. 2. Moreover, spacing between studs 22 and 24 is such that these studs are nearly tangential to the exterior of pipe 10. Therefore, cable 40 is in contact with at least half the circumference of pipe 10.

Nuts 34 and 36 are received on the second threaded ends of studs 22 and 24, and these nuts are respectively tightened down upon cable 40 prior to tightening of nuts 26 and 28, or even prior to reception of nuts 26 and 28 onto studs 22 and 24. Nuts 34 and 36 are desirably countersunk on the side thereof adjacent the cable, i.e. at 48 in FIG. 3, to establish a secure crimping action with respect to cable 40 where it passes into bore 50. Thus, nuts 34 and 36 bend the cable angularly away from the second ends of the studs, when nuts 34 and 36 are tightened down on the cable. Then, nuts 26 and 28 are subsequently drawn up, and the cable 40 is bent in the reverse direction around nuts 34 and 36, i.e. as illustrated at 42 and 44, for completing a secure cable connection. The cable 40 is desirably wedged at this point between the nuts 34 and 36 and the sides of pipe 10, with cable 40 passing in close contact with pipe 10 for well over half the circumference of pipe 10.

Between clamping plate 20 and the side of pipe 10 around aperture 16, there is disposed an annulus comprising an O-ring seal 38 formed of resiliently compressible material, e.g. a synthetic rubber such as neoprene. The seal is toroidal or doughnut-shaped and is preferably circular or oval in longitudinal cross section, i.e. as particularly illustrated in cross section at 38 in FIG. 2. That is, the seal is thick and generally rounded in cross section, and compressible for expansion inwardly and outwardly. The O-ring seal is received immediately around pipe 12 so the seal at least at such time comprises an annulus having an aperture substantially or nearly identical to the outside diameter of pipe 12. The O-ring seal 38 is then compressed by drawing up nuts 26 and 28 whereby the O-ring seal is compressed against pipe 10 and pipe 12, sealing the junction between the sewer line and the branch pipe against outside filtration. At the same time, the O-ring seal securely and substantially entirely supports the end of branch pipe 12 so that branch pipe 12 can extend horizontally, for example, in an otherwise unsupported manner, directly away from pipe 10. The pipe 12 in such instance can support additional weight placed thereupon. However, the support thus provided by the O-ring is slightly resilient in response to weight placed upon the branch pipe, and therefore the seal is maintained despite pressures that may be applied. For instance, the seal is maintained despite the heavy weight of earth placed upon the sewer tap connection after completion thereof, and such filtration as is common with the usual concrete connection as a result of cracking under the stress of weight is avoided.

The diameter of the cross section of the O-ring seal, e.g. as illustrated at 38 in FIG. 2, should be appreciably more than the difference between the outside diameter of pipe 12 and the inside diameter of apertures 16 and 23. It is also desirably comparable to the wall thickness of pipe 10 in the case of the usual sewer pipe installation. In a typical instance, the O-ring seal has an unstressed diameter at the cross section illustrated at 38 of approximately 1⅛ inches. With tightening of nuts 26 and 28, the seal may be flattened down so that the separation between plate 20 and the side of pipe 10 is approximately three-fourths inch.

Plate 20 is suitably cast iron or steel, and has a configuration conforming generally to the outside diameter of pipe 10. That is, the major portion of clamping plate 20, e.g. between ears 31 and 33, is approximately cylindrical in the cross section of FIG. 2 whereby to maintain a substantially uniform spacing between the rounded side of pipe 10 and clamping plate 20. Cylindrical is here taken to mean having the configuration in cross section corresponding to a segment of a cylinder. Ears 31 and 33 extend straight outwardly in a direction perpendicular to the centerline of pipe 12. Although clamping plate 20 is desirably cylindrical in cross section corresponding to the cross section of pipe 10, in order to conform generally to the outer cylindrical configuration of pipe 10, the connection is not restricted to a main sewer line of a particular size. Rather, the clamping means here employed, including cable 40, is adaptable to different sizes of pipe 10 in which case it is desirable that clamping plate 20 be approximately similar in its cylindrical configuration of cross section to the average size pipe 10 which is likely to be encountered. The cable 40 adapts the connection to many sizes of sewer line. Essentially the same structure can be used for a 6 inch main sewer line or a 60 inch main sewer line. Moreover, the present construction can be employed without much danger of poor sealing as a result of entrapped rock or loose gravel between the O-ring seal and the pipes, or between a back clamping structure and pipe 10 since only a cable is used. The present connection can also be handled more easily without as much excavation as would be required if a more complex back structure had to be applied around pipe 10. That is, the cable with a stud on the end can be passed behind pipe 10 after the stud is secured to the cable, and then the seal tightening can be accomplished from the side of pipe 10 in which aperture 16 is provided, by tightening nuts 26 and 28.

In operation, the cable 40 is first passed through bores 50 of studs 22 and 24 with an appropriate length of cable 40 located between studs 22 and 24 for approximating slightly more than half of the circumference of the main sewer line to which a tap connection is to be made. Then, nuts 34 and 36 are secured tightly down onto cable 40, crimping or bending the cable into the countersunk portion of nuts 34 and 36. Clamping plate 20 is placed over the branch pipe 12, followed by O-ring seal 38.

The O-ring seal 38 is placed over the end of pipe 12 at a distance from end 14 approximating the allowable projection of pipe 12 into aperture 16, with end 14 falling approximately at the location of the inside wall 18 of pipe 10. Of course, in the case of the FIG. 4 construction where the end 14' of pipe 12' is configured to match the interior wall 18', the O-ring seal 38' should similarly be placed on the branch pipe end so that no more than the desired amount protrudes into aperture 16'.

The studs 22 and 24 are inserted into holes 30 and 32 as branch pipe 12 is inserted within aperture 16 of pipe 10. At this time, the O-ring seal should make contact with three members, pipes 10 and 12 and clamping plate 20. Then, nuts 26 and 28 are placed on the ends of studs 22 and 24 and tightened down so as to compress O-ring seal 38 tightly against pipes 10 and 12. E.G., the O-ring may be flattened to about half its original cross-sectional diameter, although this much pressure is frequently not necessary for adequate support and sealing.

An alternative construction for securing a cable to the two studs of the clamping means is illustrated in FIGS. 5 through 7. Here, a cable 40' is passed through a diametrical bore in stud 24', after which a washer 52 is placed over the end of stud 24'. Washer 52 is provided with a diametrical groove 54 on one side thereof for substantially matching the cable 40', and is placed over the end of stud 24' against the cable with the cable fitting into such groove. Now, nut 36' is threadably received over washer 52 and is tightened down against washer 52 for thereby securing cable 40' in place. This construction has the advantage of avoiding possible fraying of the cable. If desired, the washer 52 may have a somewhat countersunk or tapered configuration similar to that illustrated at 48 in FIG. 3 for nut 36.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A sewer tap for making connection to a main sewer line in the form of a substantially cylindrical pipe comprising:

a cylindrical branch pipe smaller in diameter than said main sewer line, said main sewer line having an aperture in the side thereof, wherein a first end of said branch pipe is smaller in cylindrical diameter than said aperture, said first end of said branch pipe being at least partially received into said aperture with said branch pipe extending normally from said sewer line, an annular clamping plate having a substantially constant thickness and spaced relation to said side of said sewer line said clamping plate having an annular aperture through its thickness with said branch pipe extending through the annular aperture of said plate and at least partially into the aperture of the main sewer line whereby a clearance is provided between the outer surface of the branch pipe and the walls of the apertures in the main sewer line and the clamping plate a toroidal sealed formed of resilient sealing material disposed immediately around and bearing against said branch pipe between said clamping plate and said main pipe and spacing said clamping plate from said main pipe, and means adjustably attached to said clamping plate between diametrically opposite sides of said branch pipe and extending around said main sewer line for tightly drawing up said clamping plate toward said sewer line and compressing said toroidal seal against said sewer line and said branch pipe for sealing the junction of said sewer line and branch pipe against outside filtration, said toroidal seal tightly surrounding said branch pipe for securely supporting said branch pipe from said sewer line, said toroidal seal, said clamping plate, and said sewer line comprising substantially the sole support of said branch pipe from said sewer line whereby said branch pipe may move with respect to said main sewer line and said clamping plate.

2. The apparatus according to claim 1 wherein said means adjustably attached to said clamping plate and extending around said sewer line includes a cable passing around said sewer line, and means for tensioning said cable toward said clamping plate.

3. The apparatus according to claim 1 wherein said clamping plate is provided with ears extending beyond the diameter of the main sewer line at diametrically opposite sides of said clamping plate for connection to said means adjustably attached to said clamping plate.

4. The apparatus according to claim 1 wherein said means adjustably attached to said clamping plate and extending around said main sewer line comprises a pair of studs extending through holes provided in said clamping plate at diametrically opposite sides of said branch pipe, said studs being provided with first nuts proximate first ends thereof for tightening said studs with respect to said clamping plate, said studs having diametrical bores proximate second ends thereof, said means adjustably attached to said clamping plate and extending around said main sewer line further including a cable extending through a said bore in a first stud, around said main sewer line, and through a said bore in a second stud, and second nuts threadably received on second ends of said studs for securing said cable extending through said bores, said cable bending over the sides of said second nuts and extending tightly around said main sewer line as said first nuts are tightened with respect to said clamping plate for drawing up said cable and compressing said toroidal seal.

5. The apparatus according to claim 4 wherein said second nuts are each countersunk on the side toward said cable for at least partially receiving the side of the cable therewithin and for bending the cable, where the cable passes from said bores, angularly away from said second ends of said studs.

6. The apparatus according to claim 4 including first and second washers received on said studs between said second nuts and said cable, said washers each being provided with a groove on the side of such washers toward such cable for at least partially receiving said cable therewithin as said second nuts are tightened toward said washers and said cable.

7. The apparatus according to claim 1 wherein the side of said clamping plate, toward said main sewer line and said toroidal seal, is approximately cylindrical, conforming generally to the outer cylindrical configuration of said main sewer line.

8. The apparatus according to claim 1 wherein said toroidal seal comprises an O-ring seal having a rounded cross section adapting the same for expansion in tightened sealing relation to said pipe and said line.

9. The apparatus according to claim 1 wherein the first end of said branch pipe extends only so far as the inner wall of said main sewer line.

10. The apparatus according to claim 1 wherein the first end of said branch pipe is conformed in contour to the inner wall of said main sewer line.

11. The apparatus according to claim 1 wherein said means adjustably attached to said clamping plate and extending around said main sewer line comprises at least one stud extending through a hole provided in said clamping plate at one side of said branch pipe, said stud being provided with a nut at the end thereof which extends in the direction of said branch pipe for tightening said stud with respect to said clamping plate.

* * * * *

UNITED STATES PATENT OFFICE
CERTIFICATE OF CORRECTION

Patent No. 3,663,042      Dated  May 16, 1972

Inventor(s)  Dwight W. Fowler

It is certified that error appears in the above-identified patent and that said Letters Patent are hereby corrected as shown below:

Col. 5, line 20 (Claim 1, line 12)  after "and" insert --disposed in--

Col. 5, line 21 (Claim 1, line 13)  after "line" insert a comma (,).

Col. 5, line 28 (Claim 1, line 20) after "toroidal" change "sealed" to --seal--

Signed and sealed this 5th day of September 1972.

(SEAL)
Attest:

EDWARD M. FLETCHER, JR.
Attesting Officer

ROBERT GOTTSCHALK
Commissioner of Patents